No. 716,034. Patented Dec. 16, 1902.
L. HARRISS & W. H. KENDALL.
COMBINED TOUCH REGULATING AND MUTE ATTACHMENT FOR PIANOS.
(Application filed Mar. 8, 1902.)
(No Model.) 4 Sheets—Sheet 2.
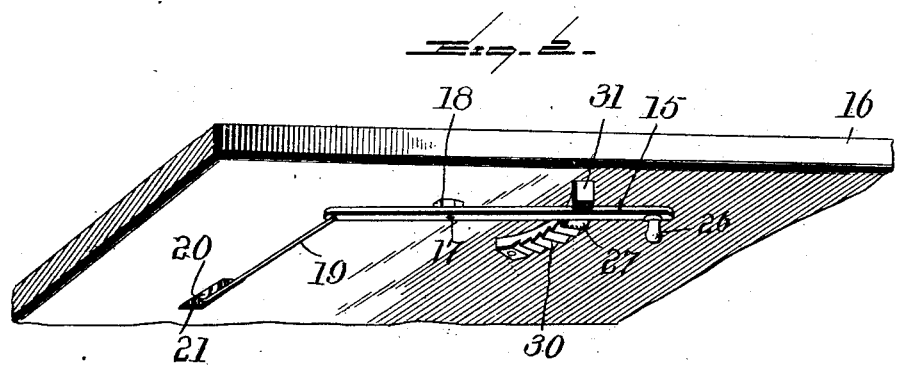
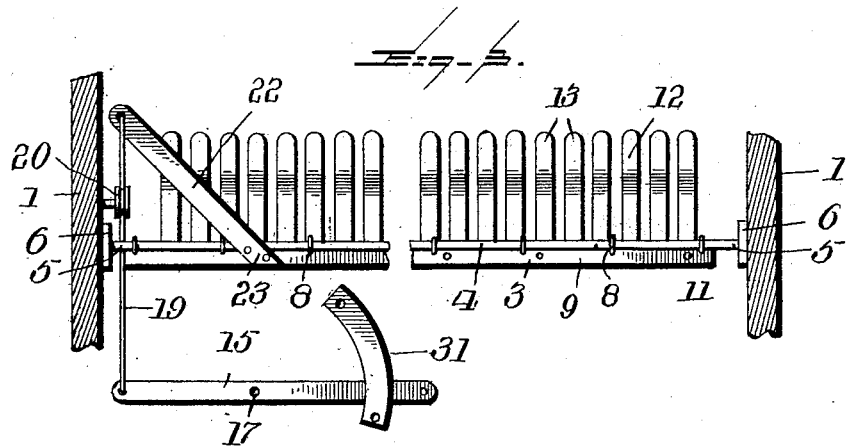
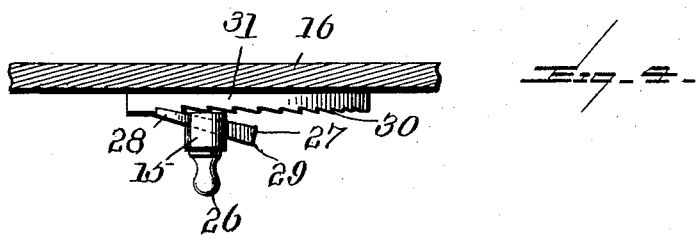
WITNESSES:
INVENTORS
Langdon Harriss and
By William H. Kendall,
Attorney

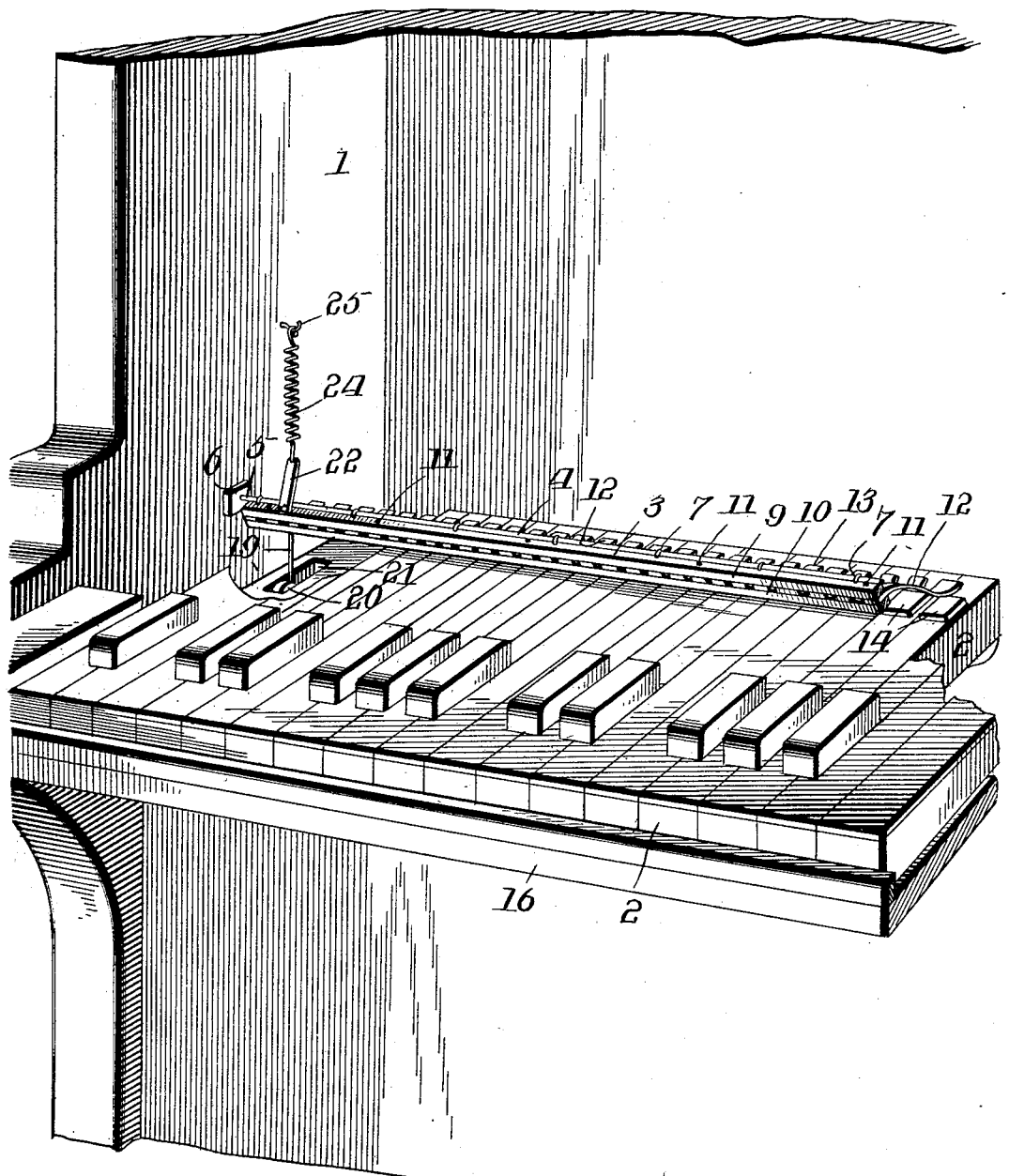

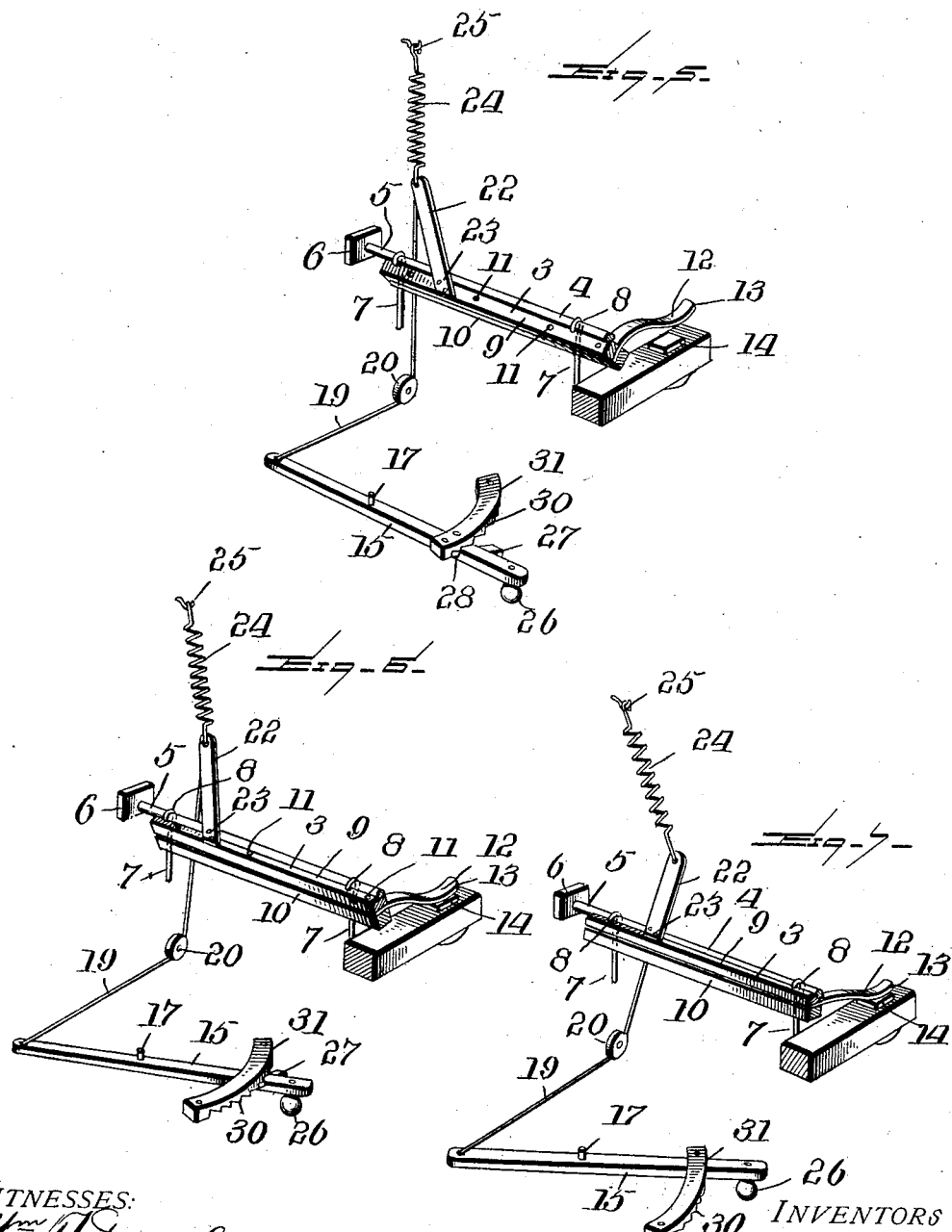

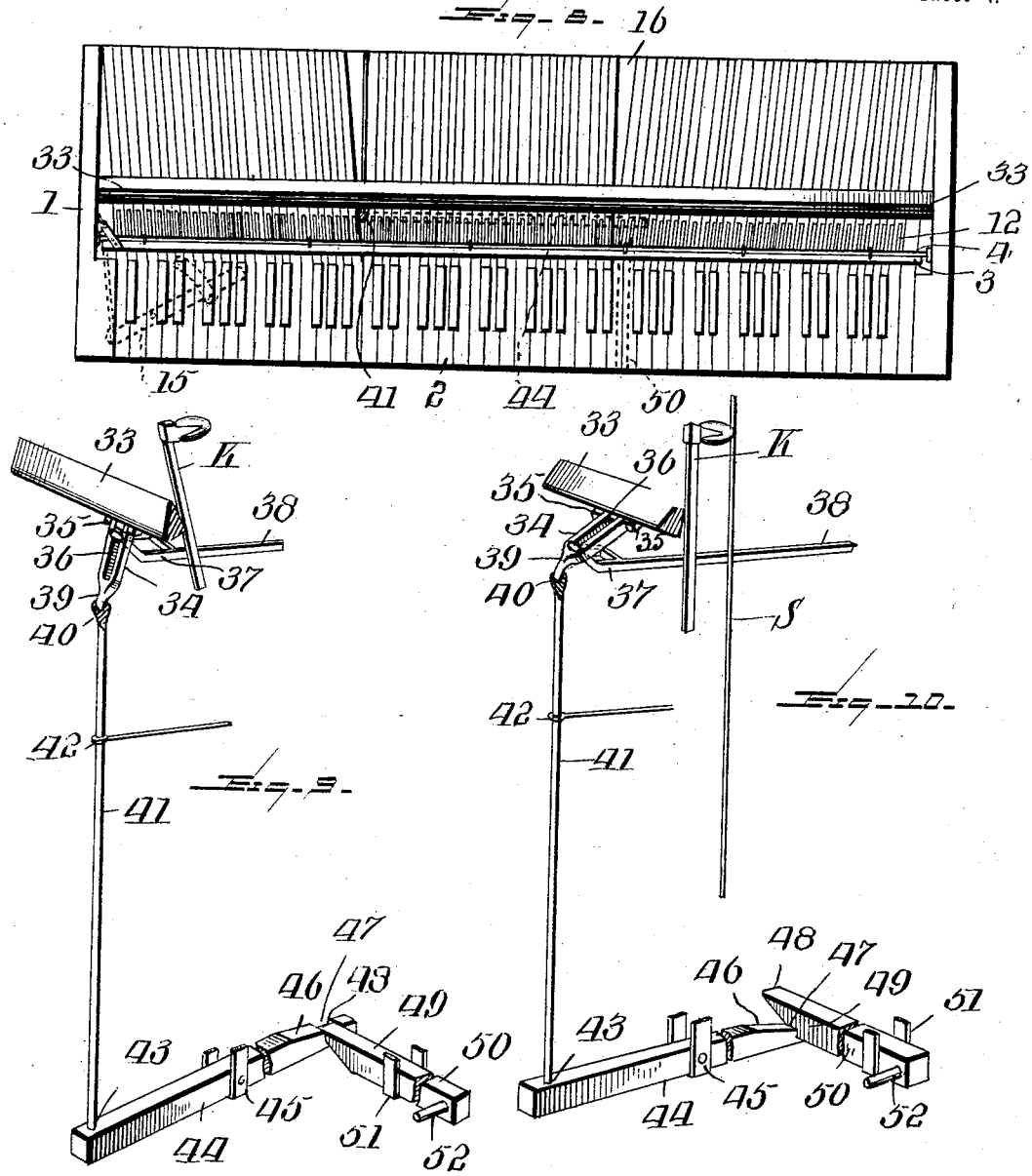

UNITED STATES PATENT OFFICE.

LANGDON HARRISS AND WILLIAM H. KENDALL, OF WACO, TEXAS.

COMBINED TOUCH-REGULATING AND MUTE ATTACHMENT FOR PIANOS.

SPECIFICATION forming part of Letters Patent No. 716,034, dated December 16, 1902.

Application filed March 8, 1902. Serial No. 97,235. (No model.)

*To all whom it may concern:*

Be it known that we, LANGDON HARRISS and WILLIAM H. KENDALL, citizens of the United States, residing at Waco, in the county of McLennan and State of Texas, have invented certain new and useful Improvements in a Combined Touch-Regulating and Mute Attachment for Pianos, of which the following is a specification.

This invention relates to that type of piano attachments possessing special utility for exercising purposes, and has special reference to an attachment of this character combining novel and efficient means for regulating the touch of the instrument and also for muting the strings thereof, so that exercise may be afforded at any desired degree of tension or stiffness of the keys with the instrument either mute or sounding when the exercise is intended to provide for cultivating the sense of harmony.

In carrying out the above general objects the invention has in view the provision of a practical yet simple form of touch-regulator mechanism designed to be arranged entirely out of sight, as well as out of the way of the piano-action, while at the same time embodying means for regulating the tension or degree of stiffness in the movement of the keys, whereby a corresponding resistance and effort will be required on the part of the player, thus affording the necessary manual exercise or calisthenics which promotes suppleness and flexibility of the wrists and finger-muscles and also provides for increased playing strength and endurance.

The invention also provides a construction of touch-regulating mechanism wherein the effect of the regulated touch is entirely uniform throughout the entire keyboard, besides adding elasticity and responsiveness to the piano-action without any lost motion, looseness, or rattling of the keys.

A further object of the invention is to combine with the regulating mechanism a device coöperating therewith to provide means for muting the strings through a locking action of the hammers thereagainst, thus providing for a perfectly mute instrument and leaving the keys entirely free to have any tension desired placed thereon through the medium of the touch-regulating mechanism.

With these and many other objects in view, which will more readily appear as the nature of the invention is better understood, the same consists in the novel construction, combination, and arrangement of parts, which will be hereinafter more fully described, illustrated, and claimed.

The essential features of the invention are necessarily susceptible to modification in structural details without departing from the spirit or scope thereof; but a preferred embodiment of the invention is shown in the accompanying drawings, in which—

Figure 1 is a perspective view of a portion of a piano-keyboard, illustrating associated with the keys thereof the touch-regulating mechanism constituting a part of the present invention. Fig. 2 is a detail fragmentary perspective view showing more plainly the operating device of the touch-regulating mechanism, which is preferably located at the under side of the keyboard entirely out of the way and in convenient position for being manipulated by the player. Fig. 3 is a plan view of the complete touch-regulating mechanism. Fig. 4 is a detail edge view of the operating device for the regulating mechanism, showing more clearly the locking engagement of the adjusting-lever with the locking-segment at the under side of the keyboard. Figs. 5, 6, and 7 are similar details in perspective showing several positions of the touch-regulating mechanism to provide for varying the tension or stiffness of the instrument-keys. Fig. 8 is a diagrammatic view of the keyboard of a piano, showing the relative operative positions of the touch-regulating mechanism and the muting device which constitute the complete attachment. Figs. 9 and 10 are similar perspective views showing the complete muting device associated with the parts of the instrument with which the same coöperates. Figs. 11 and 12 are detail sectional views of the knife-edge bearing with the parts represented in the positions indicated in Figs. 9 and 10.

Like reference characters designate corresponding parts throughout the several figures of the drawings.

In carrying out the invention no change whatever is required in the clavier or instrument to which the same is applied. It is designed to be entirely out of the way, so as to not interfere in any manner with the ordinary manipulation of the instrument, while at the same time effectually preserving the functions contemplated. Also different expedients may be resorted to in the detail mounting of the several parts of the complete attachment, according to the particular make of instrument with which the same may be associated; but for illustrative purposes the invention is shown in the drawings as applied to the ordinary type of upright piano.

The numeral 1 designates the body portion or case of the piano or instrument, and the numeral 2 designates the keys thereof, the latter being connected at their rear ends within the case with the usual jack-levers coöperating with the hammers for throwing the latter against the strings S; but as no change is involved in the construction of the piano-action itself it has been deemed sufficient for the purpose of this application to simply illustrate those parts of the instrument which are directly associated with the attachment.

As already stated, one of the important parts of the attachment resides in a touch-regulating mechanism, which touch-regulating mechanism may be properly said to consist of a tension device acting directly upon the keys of the instrument and an adjustable operating device for controlling the tension device.

The tension device of the regulating mechanism primarily involves a rocking pressure-bar 3, which is arranged longitudinally of the case and extends from end to end thereof horizontally of the keyboard. This rocking pressure-bar 3 may be said to be disposed in parallelism to the keyboard above all of the keys of the instrument, and while the same may be mounted to rock or turn upon an axis in any suitable manner a preferred way of accomplishing this result is shown in the drawings and consists in pivotally suspending the bar 3 from a hanger-rod 4, extending the full length of the pressure-bar and having projecting terminals 5, fitted to the supporting-blocks 6, mounted inside of the case upon the end walls thereof, as plainly indicated in Figs. 1 and 3 of the drawings. It is also preferable in the pivotal mounting or hanging of the rocking pressure-bar 3 to have the pivot-axis, which is provided by the hanger-rod 4, disposed at the rear upper edge thereof in order that there may be the greatest possible freedom of movement for the bar, while at the same time conveniently permitting of a stiffening or bracing thereof through the medium of a plurality of intermediate braces 7. These intermediate braces 7 in the construction shown are in the form of screw-hooks suitably fastened in the bottom of the keyboard and having their upper loop ends 8 engaged with the hanger-rod 4. By the reason of the employment of the intermediate braces 7, connected with the hanger-rod at different points, the same is held perfectly straight and rigid throughout its entire length, so as to prevent any displacement of the rod or the pressure-bar buckling or otherwise weakening at an intermediate point, and thus interfering with a uniform tension throughout the entire series of keys of the keyboard.

The rocking pressure-bar 3 may be constructed in various ways, but preferably consists of a pair of clamping-strips 9 and 10, secured firmly together by screws or equivalent fastenings 11 and clamped tight upon the fast ends of the tension-springs 12, projecting in a uniform series from one side of the pressure-bar. By reason of this construction any of the tension-springs may be readily removed or replaced or readjusted, as may be desired or required.

The tension-springs 12 are preferably of a sigmoidal form, with curved pressure-tips 13 adapted to firmly bear in yielding contact with the keys 2 of the instrument inside of the case. In order that this contact may be perfectly soft and noiseless, as well as to obviate undue friction or wear between the tips of the springs and the inner portions of the keys, there is usually applied to the upper sides of the keys at the point of contact for the springs felt or equivalent contact pads 14.

It is of course understood that there are the same number of tension-springs 12 as there are keys in the keyboard of the instrument, and there is the same spaced relation preserved between the keys and the springs, whereby each key has its own individual tension-spring, although the tension is always the same upon all of the keys of the keyboard.

To render the tension device just described thoroughly effective under all conditions, it is necessary to provide an operating device embodying means for varying the pressure of the springs upon the inner portion of the instrument-keys. In the present invention this operating device includes a main adjusting-lever 15, arranged beneath the bottom portion 16 of the keyboard and preferably contiguous to one end thereof, so as to be located in a convenient position for being readily grasped by one hand of the operator. The main adjusting-lever 15 is pivotally mounted intermediate its ends, as at 17, upon a pivot-block 18, secured fast to the under side of the keyboard-bottom 16, and one end of the said adjusting-lever 17 has secured thereto one end of a flexible pull connection 19, which may consist of a stout cord or light wire. This flexible pull connection extends from one end of the lever 15 beneath the keyboard-bottom 16 and around a guiding-pulley 20, loosely mounted within the case at the bottom of the keyboard.

Preferably the guiding-pulley is located in or adjacent to an opening 21, through which the flexible pull connection 19 is extended upwardly. The end of the flexible pull connection 19, which is disposed within the piano or instrument case, is connected to one end of a setting-arm 22, which is secured fast at its other end, as at 23, to the rocking pressure-bar 3. The setting-arm 23 is preferably arranged diagonally, so that it may be connected to the pressure-bar at a point removed from one end of the latter in order to better distribute the pulling strain upon the pressure-bar in either direction. There is also associated with the setting-arm 22 a retracting-spring 24. The spring 24 is secured at one end to the free end of the arm 22 and at its other end to a fixed point of attachment 25 upon the adjacent end wall of the piano or instrument case.

The end of the main adjusting-lever 15 opposite the pull connection 19 thereof is provided with a downwardly-projecting finger-hold or button 26, and also carries at or contiguous to said end a catch-dog 27. The catch-dog 27 is disposed transversely of the lever 15 and projects at opposite sides thereof. One of the projecting portions of the dog has the engaging point 28, and the opposite projecting portion constitutes a releasing-heel 29, which may be engaged by a finger to assist in imparting the slight stress necessary to the lever for disengaging the point 28 of the dog from the ratchet-notches 30 of the locking-segment 31, secured to the under side of the keyboard-bottom 16 in concentric relation to the pivot 17 of the lever 15.

By reason of the construction described it is obvious that any degree of pressure may be yieldingly placed upon the keys of the instrument. With the parts in the position shown in Fig. 5 of the drawings and the adjusting-lever 15 disposed well forward, the retracting-spring 24 holds the pressure-bar and the tension-fingers carried thereby in an inactive position entirely out of the way, so as to not interfere with the action of the instrument at its ordinary tension. Should it be desired to increase the tension or stiffness of the keys for exercising or other purposes, it is simply necessary to move the dog-carrying end of the adjusting-lever backward to bring the point of the dog in engagement with any desired notch of the locking-segment. An intermediate degree of adjustment for the tension device is shown in Fig. 6 of the drawings, while in Fig. 7 the adjusting-lever is illustrated as being moved to its extreme backward position, with the consequence of holding the tension-springs in engagement with the keys at the greatest pressure, thus giving to the action very great stiffness or tension, which may be required as the player gains additional strength and endurance.

While under some conditions the touch-regulating mechanism described may be utilized solely to increase or vary the ordinary tension of the keys, especially when harmony exercises are combined with touch or technic exercises, still the invention has in view associating with the said touch-regulating mechanism a muting device comprising means for muting the strings through a locking action of the hammers. This device is shown in its entirety in Figs. 9 and 10 of the drawings, and its position in relation to the entire keyboard is diagrammatically indicated in Fig. 8.

The muting device is designed to be directly associated with the hammer-rail 33 of the piano-action, with which hammer-rail coöperate the hammers K of the instrument. The invention contemplates no change in the usual mounting of the hammer-rail nor in the coöperation of the action as an entirety therewith, but is intended to utilize the hammer-rail as a part of the locking device for holding the hammers clamped in firm contact with all of the strings, thus rendering the instrument perfectly mute. To accomplish these results, there is fitted to the hammer-rail 33 at a convenient point intermediate the ends thereof an offstanding longitudinally-slotted bearing-cleat 34. This longitudinally-slotted bearing-cleat 34 may be secured fast to the under side of the hammer-rail in any convenient way, but preferably by means of gluing, and having the connection thereof with the hammer-rail strengthened through the medium of reinforcing-blocks 35, also glued to the hammer-rail alongside of one end of the bearing-cleat.

The longitudinal slot 36 of the bearing-cleat loosely receives and works over the angular supporting-head 37 of a fulcrum-bracket 38, secured to and projected forwardly from the back of the piano-action. At its lower and outer end the said bearing-cleat 34 is provided with a knife-edge bearing 39, which engages the seat 40, provided at the upper end of a vertically-movable setting-stem 41, working through one or a plurality of guide-eyes 42 and extending through the bottom of the keyboard. The lower end of the vertically-movable setting-stem 41 is connected, as at 43, to one end of a vertically-swinging adjusting-lever 44, arranged horizontally beneath the keyboard. This adjusting-lever is pivotally supported intermediate its ends, as at 45, and is provided at its free end with the beveled face 46, having therein a guide-notch 47, receiving the nose 48 of the wedge 49, provided at the inner end of a reciprocatory operating-slide or slide-bar 50. This operating-slide or slide-bar 50 is mounted to work in suitable guide-keepers 51, fitted to the under side of the keyboard-bottom and serving to hold the slide to movement in a fixed plane. The outer end portion of the slide or slide-bar 50 is provided with a finger-hold 52, whereby the same may be conveniently grasped by the player to provide for moving the slide inward or outward, according as it is desired to have the instrument mute or sounding. The vertically-swinging adjusting-lever 44 is disposed longitudinally with reference to the piano or instrument, while the operating-slide or slide-bar 50 is disposed transversely to the instrument, and consequently at substantially right angles to the lever 44, which it actuates.

Ordinarily with the operating-slide or slide-bar 50 drawn outward the hammer-rail 33 is free to drop to the lowered inactive position; but should it be desired to render the instrument mute the player moves the slide or slide-bar 50 inward, causing the wedge 49 to move over the beveled face 46 at one end of the lever 44, with the consequence of tilting the said lever upon its axis or pivot and forcing the setting-stem 41 upward. This movement of the setting-stem tilts the bearing-cleat 34 upward and backward, with the consequence of moving the hammer-rail in a similar direction, so that it will carry all of the hammers K into firm contact with the strings, besides locking the same in such positions. This renders the instrument perfectly mute. In the action described the slotted bearing-cleat 34 rides over the angular supporting-head 37 of the fulcrum-bracket, while the knife-edge bearing 39 permits of this movement with a minimum amount of friction. When the muting device is thrown into use, as described, the weight of the piano-action is entirely removed from the keys, so that it is absolutely necessary to utilize the touch-regulating mechanism to impart sufficient tension or stiffness to the keys for exercising purposes.

From the foregoing it is thought the construction, operation, and many advantages of the herein-described attachment will be readily apparent without further description, and it will be understood that various changes in the form, proportion, and minor details of construction may be made within the scope of the invention without departing from the spirit or sacrificing any of the advantages thereof.

Having thus described the invention, what is claimed, and desired to be secured by Letters Patent, is—

1. In an attachment of the class described, the combination with the piano-action, and the touch-regulating mechanism, of a muting device including a movable hammer-rail adapted to move against the hammers and carry the latter to a position in contact with the strings, and an operating device having a tiltable element connected with the hammer-rail and movable to a position for locking the same against the hammers while the latter are in contact with the strings and serving to hold the weight of the piano-action off the keys.

2. In an attachment of the class described, the touch-regulating mechanism comprising a rocking pressure-bar arranged above the keyboard and provided with a series of offstanding pressure-springs for the keys and also provided with an offstanding arm, a retracting-spring connected with said arm, and an exterior operating device consisting of an adjusting-lever having locking means, and a flexible pull connection with the arm of said pressure-bar, substantially as set forth.

3. In an attachment of the class described, the touch-regulating mechanism comprising a hanger-rod arranged longitudinally of the instrument-case above the keyboard, intermediate braces for the said hanger-rod, a rocking pressure-bar pivotally suspended from the said rod and having a setting-arm, a uniform series of duplicate tension-springs detachably secured at one end to the pressure-bar and arranged to work over and upon the keys, a retracting-spring connected with the setting-arm, and an exterior operating device having a flexible pull connection with the said setting-arm.

4. In an attachment of the class described, the touch-regulating mechanism comprising a pivotally-supported rocking pressure-bar arranged above the keyboard and provided with a uniform series of laterally-extending tension-springs arranged to bear upon the keys of the instrument under varying pressure, said pressure-bar also having a setting-arm, a retracting-spring connected with said setting-arm, and an exterior operating device arranged beneath the keyboard-bottom and consisting of a pivotal main adjusting-lever having a flexible pull connection at one end with the setting-arm of the pressure-bar and provided at or contiguous to its opposite end with a catch-dog, and a ratchet-locking segment arranged in a fixed position concentric with the pivot or axis of the said lever.

5. In an attachment of the class described, the touch-regulating mechanism comprising a pivotally-supported rocking pressure-bar having a uniform series of offstanding tension-springs for engagement with the keys and also provided with an offstanding setting-arm, a retracting-spring connected with said arm, a suitably-arranged guide-pulley, an adjustable lever pivotally mounted beneath the keyboard-bottom, and a flexible pull connection between one end of said lever and the setting-arm of the pressure-bar, said pull connection passing from beneath the keyboard around the pulley and into the case of the instrument.

6. In an attachment of the class described, the combination with the piano-action and the touch-regulating mechanism for the keys, of a muting device including a suitably-arranged fulcrum-bracket, a cleat fast to the hammer-rail and having a shiftable pivotal engagement with the fulcrum-bracket to permit the rail to be moved to a locked position against the hammers, and operating means having an operative connection with the said cleat.

7. In an attachment of the class described, the combination with the piano-action and the touch-regulating mechanism, of a muting device including a suitably-arranged fulcrum-bracket, a slotted bearing-cleat shiftably working upon the bracket and fixed to the hammer-rail, and operating means embodying a stem having a knife-edge-bearing connection with the said cleat.

8. In an attachment of the class described, the combination with the piano-action and the touch-regulating mechanism, of a muting device comprising a fixed fulcrum-bracket, a slotted bearing-cleat fast to the hammer-rail and shiftably working upon the bracket, said cleat having a knife-edge bearing at one end, a reciprocatory setting-stem engaging the knife-edge bearing of the cleat, a vertically-swinging adjusting-lever pivotally supported intermediate its ends and having one end engaged with the said stem, the other end of said lever having a beveled contact-face, and a reciprocatory operating-slide or slide-ba[r] mounted beneath the keyboard and havin[g] an inner wedge end coöperating with the bev[-]eled contact-face of said lever.

In testimony whereof we affix our signatures in presence of two witnesses.

LANGDON HARRISS.
WILLIAM H. KENDALL.

Witnesses:
NORMAN H. SMITH,
HENRY CLAY COLLIER.